Figure 1:
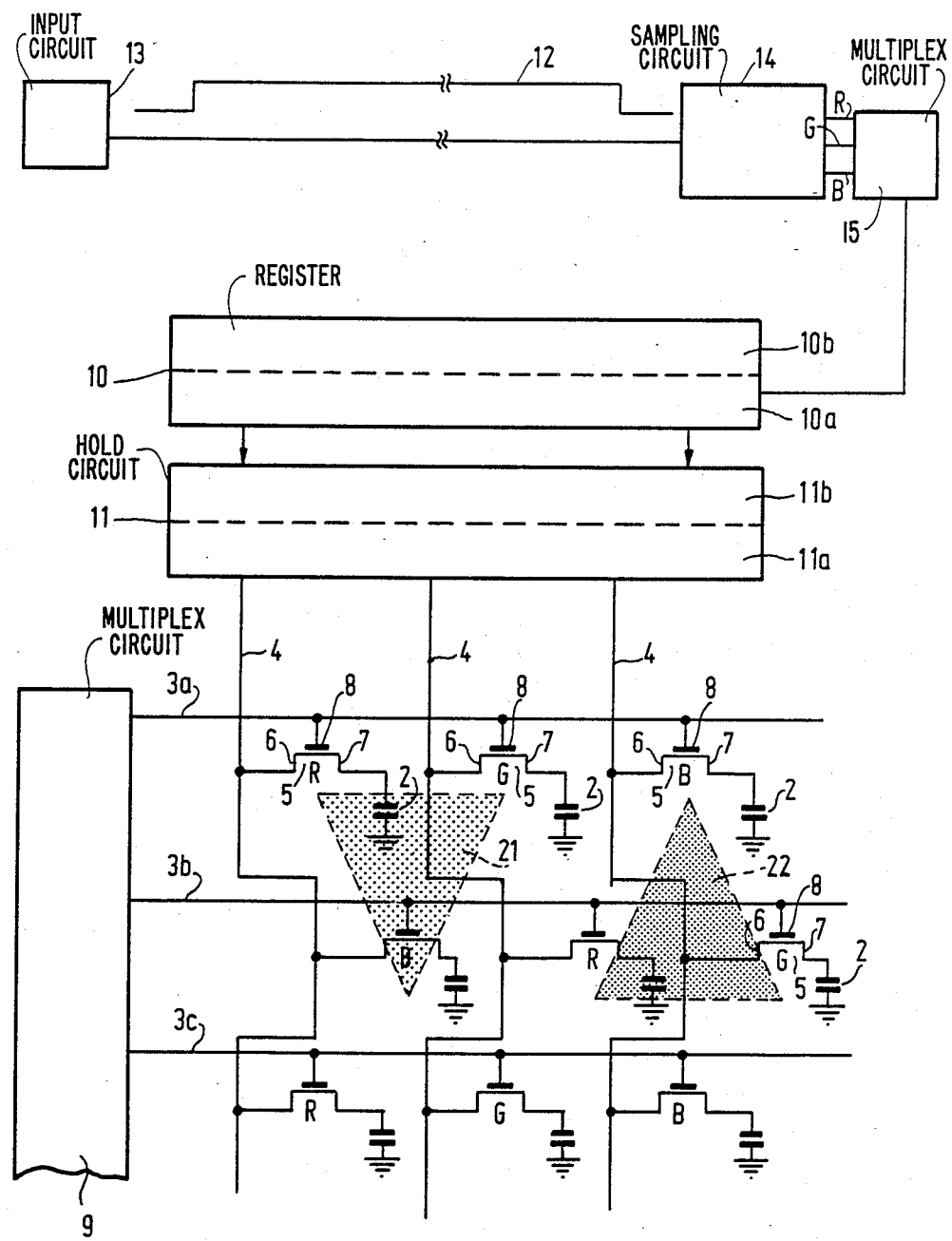

United States Patent [19]

Stroomer

[11] Patent Number: 4,908,609
[45] Date of Patent: Mar. 13, 1990

[54] COLOR DISPLAY DEVICE

[75] Inventor: Martinus V. C. Stroomer, Eindhoven, Netherlands

[73] Assignee: U.S. Philips Corporation, New York, N.Y.

[21] Appl. No.: 34,194

[22] Filed: Apr. 6, 1987

[30] Foreign Application Priority Data

Apr. 25, 1986 [NL] Netherlands ............. 8601063

[51] Int. Cl.$^4$ ............................................. H04N 9/30
[52] U.S. Cl. ...................................... 340/702; 340/784; 350/339 F
[58] Field of Search ............... 340/701, 702, 703, 784, 340/811; 350/333, 332, 339 F; 358/56

[56] References Cited

U.S. PATENT DOCUMENTS 4,642,619  2/1987  Togashi ............................. 340/701
4,651,148  3/1987  Takeda et al. ..................... 340/811

FOREIGN PATENT DOCUMENTS 0158366  10/1985  European Pat. Off. .
0194315   3/1986  European Pat. Off. .

Primary Examiner—Alvin Oberley
Attorney, Agent, or Firm—John C. Fox

[57] ABSTRACT

In a color display device color elements (17, 18, 19, 21, 22, 23) are built up with the aid of picture cells (2) from juxtaposed rows of picture cells which are driven by line electrodes (3). The resolving power in the horizontal sense is increased by building up the color elements from picture cells of different rows of picture cells. The period $t_1$ which is required for driving a color element is split up into sub-periods $\tfrac{1}{2}t_1$ during which period samples of the signal to be displayed (length $t_o$) are presented to the column electrodes (4). Since notably for LCD-TV there applies that $t_1 > t_o$, these samples can be presented during a period which is longer than $\tfrac{1}{2}t_o$.

20 Claims, 3 Drawing Sheets

COLOR DISPLAY DEVICE

The invention relates to a display device for colour display with a pattern of line electrodes or scan electrodes and a pattern of column electrodes or data electrodes which cross each other, while picture cells constituting a matrix for displaying pictures are formed in an electro-optical medium at the area of the crossings of the line and column electrodes.

A liquid crystal is preferably chosen as an electro-optical medium, although the invention is also applicable to other electro-optical media such as an electrophoretic suspension or an electrochromic material.

A display device of the type mentioned above is described in European Patent Application No. 0.158,366. In the device shown in this application signal packets for the purpose of colour display in an LCD display device are stored in an (analog or digital) shift register. The picture information thus stored is transferred to the picture cells line by line. A line is written by giving it a voltage different from that of the other lines and by applying voltages to the columns which correspond to the desired optical state of the picture cells along the line. A colour picture is produced by giving the picture cells the primary colours red, green and blue, for example, by providing the picture cells with colour filters. Thus a colour picture is produced by additive mixing of the separate colours. The colours are distributed over the available picture cells in such a manner that three juxtaposed picture cells display the three primary colours throughout the matrix. If the resolving power of such a matrix for colour display is compared with that of a matrix for black-white display with a substantially equal number of picture cells of substantially the same size, this is found to have decreased by a factor of three in the horizontal direction because three juxtaposed picture cells are required for displaying each coloured dot or colour element. In order to display a colour picture by means of the above described matrix without any loss of information and with a substantially identical resolving power in both the horizontal and the vertical direction it is then necessary to triplicate the number of picture cells along a line in comparison with the matrix for black-white display. If the total dimensions of the display device remain the same, this can only be done by choosing the width of the picture cells to be three times as small, in other words by choosing the connections of the columns to be three times as close to each other. Upon selection of a minimum width and mutual distance of the line electrodes it is then impossible within a given technology to choose the number of columns with the same minimum width and mutual distance without a loss of resolving power in the horizontal sense.

Depending on the system used approximately 500 to 650 of these picture dots or colour elements are required for the display of a full television line, which brings the total number of picture cells and hence the columns in a matrix system to 1500 to 1950 while the number of rows is of the order of 440 to 500.

It is an object of the present invention to provide a picture display device in which these problems are substantially obviated.

To this end a picture display device according to the invention is characterized in that at least two adjacent rows of picture cells constitute a row of N colour elements and the display device comprises a conversion circuit which samples incoming signals having a length of $t_0$ to be displayed at a frequency $f_0 = N/t_0$ and converts the sampled signals into at least two sub-sample signals which are applied to the column or data electrodes during a display period $t_1$, only one sub-sample signal being applied to the column electrodes during driving of a line electrode associated with a row of picture cells, which line electrode is energized during a period of at most $\frac{1}{2}t_1$.

The invention is based on the recognition that the number of column connections can be reduced drastically by building up the colour elements from picture cells which are driven by different selection lines.

The invention is also based on the recognition that notably for television uses the display period $t_1$ differs from the period $t_0$ during which effective information is presented, inter alia, because the period $t_0$ in television signals is shorter than the actual line period of the TV signal presented (for example, 50 $\mu$sec instead of 64 $\mu$sec) because the latter also includes the retrace time of the electron beam, while this full TV line period is available as display period $t_1$ for display elements such as liquid crystal cells, etc.

A first preferred embodiment of a device according to the invention is characterized in that two juxtaposed rows of picture cells are used each time for displaying one picture line only. It is true that the number of line electrodes in such a device doubles to 880 to 1000 line electrodes, but simultaneously a reduction of the number of columns is possible (in comparison with the device described in European Patent Application No. 0,158,366) to 1000 to 1300 because each time 3 column electrodes in each line provide 2 colour elements with information. For a 3:4 height/width ratio of the display screen the horizontal and the vertical resolving power are then substantially the same.

Interlacing can take place by successively energizing the odd rows of picture elements or the pairs of line electrodes during the display of the odd raster and by successively energizing the even rows of picture elements or the pairs of line electrodes during the display of the even raster.

In addition it is possible to drive a row of picture cells by means of different picture lines. Such an embodiment of a device according to the invention is characterized in that the incoming signals are divided into a first raster of odd picture lines and a second raster of even picture lines, while alternately sub-sample signals of the first odd raster are presented to the column electrodes during driving of successive line electrodes, commencing with the first line electrode, and sub-sample signals of the second even raster are presented to the column electrodes during driving of successive line electrodes, commencing with the second line electrode.

In this way the content of the rows of colour elements which is determined during the odd raster period by information from the first raster and during the even raster period by information from the even raster can be displayed in such a manner that a kind of averaging takes place, while the number of line electrodes may be smaller.

The picture cells may be staggered with respect to each other over substantially half the width of a colour cell, the colour cells being contiguous and non-overlapping.

Alternatively, there may be a partial overlapping of colour cells, which even further increases the resolution in the horizontal sense.

In addition more than two rasters may be present, for example, if 1:n interlacing is used.

The relevant picture cells preferaby have the shape of a regular polygon such as a triangle, a square or a hexagon. The shape will of course not always be regular from a strictly mathematical point of view, because indentations in an electrode or another element are sometimes required for connecting a transistor zone or another part of a circuit element.

A liquid crystalline medium is, for example, chosen for the electro-optical medium. This medium may be of the nematic type but it may alternatively be a chiral-nematic, cholesteric or ferro-electric medium, as well as liquid crystals based on double refraction. The liquid crystal may be used both in the transmissive and the reflective mode.

Although passive drive is possible, active drive will certainly be preferred for larger numbers of lines. To this end the device comprises, for example, thin film IGFET-transistors having source zones connected in an electrically conducting manner to line electrodes gate electrodes to column electrodes and drain zones to display elements. Other active drive forms are alternatively possible, for example, with diode rings, MIM's etc.

Figure 2:
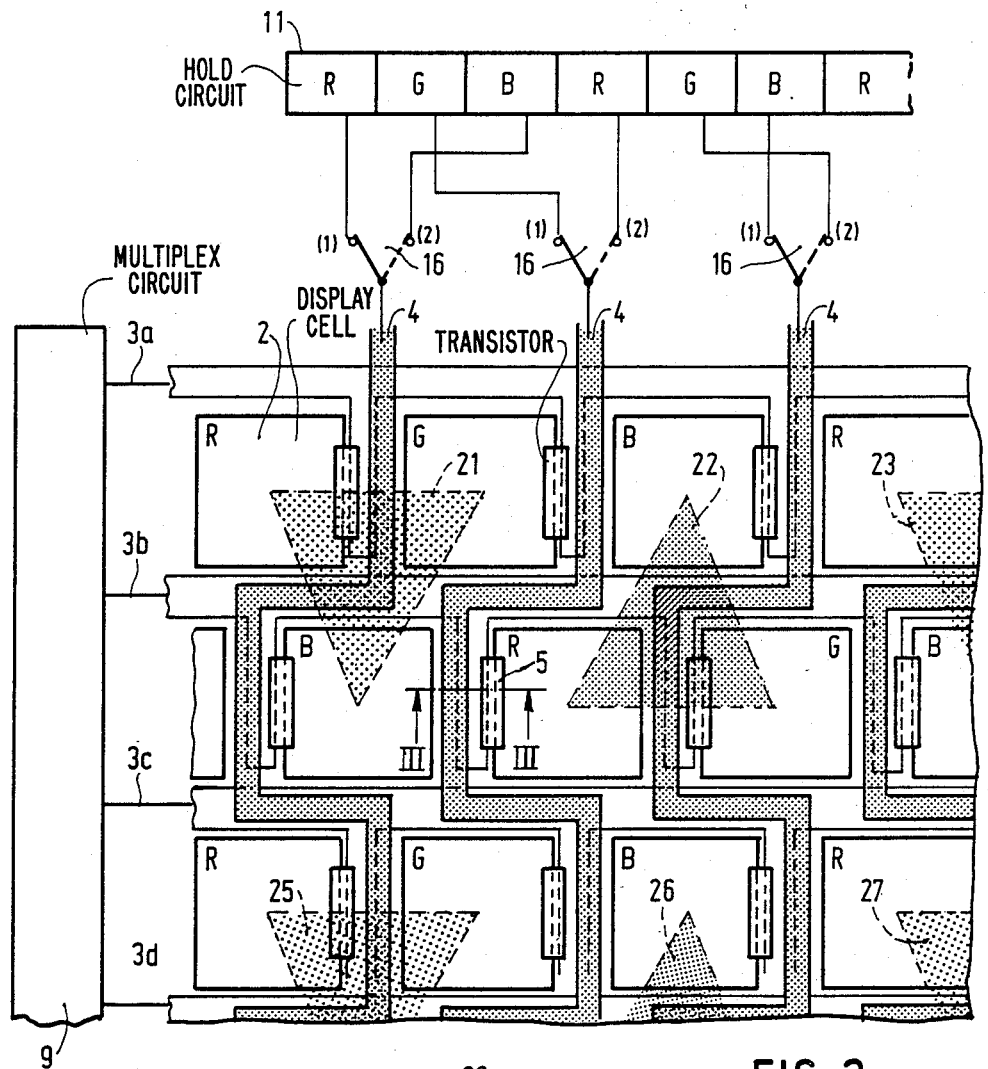
Figure 3:
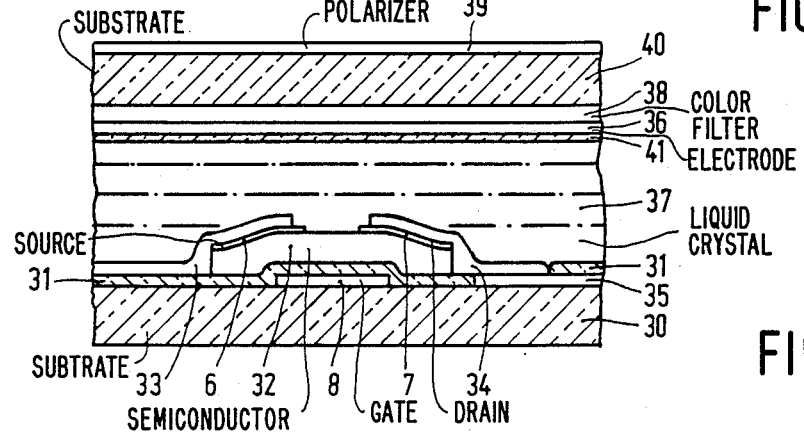
Figure 4:
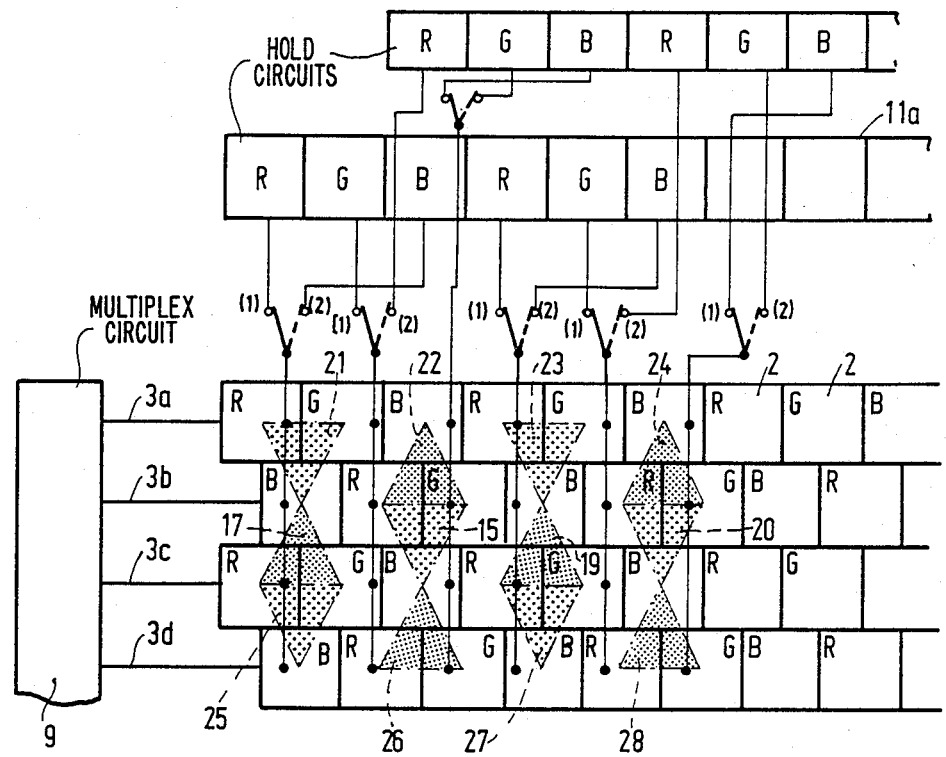
Figure 5:
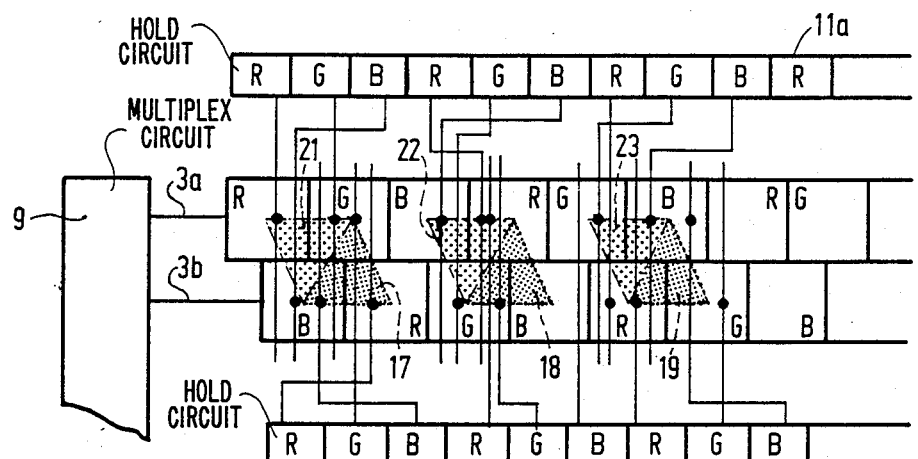

The invention will now be described in greater detail with reference to some embodiments and the drawing in which FIG. 1 diagrammatically shows a device according to the invention, FIG. 2 diagrammatically shows in a plane view a part of a pattern of picture cells as is used in a device according to the invention, FIG. 3 is a diagrammatical cross-section taken on the line III—III in FIG. 2, FIG. 4 diagrammatically shows the principle of averaging in the device of FIG. 2, and FIG. 5 diagrammatically shows another drive method.

FIG. 1 diagrammatically shows a display device 1 according to the invention. It comprises a number of display cells 2 which are shown diagrammatically at the area of crossings of line or scan electrodes 3 and column or data electrodes 4. The display cells are driven in this example by IGFET-transistors 5 whose source zones 6 are connected to the data electrodes 4, the drain zones 7 to the cells 2 and the gate electrodes 8 to the line electrodes 3. The line or scan electrodes 3 are successively energized via a multiplex circuit 9, while the data electrodes 4 are provided with information via analog shift registers 10 and hold circuits 11. The information in the shift registers 10 originates from a video signal 12 which is received, for example, via an input circuit 13 and the part of which containing picture information having a length of $t_0$ is subsequently sampled by a sampling circuit 14 in such a manner that two sub-signals are obtained in this example whose RGB information (red-green-blue) is stored via a multiplex circuit 15 in two registers $10^a$, $10^b$ and hold circuits $11^a$, $11^b$.

According to the invention the colour cells 21 and 22, denoted by means of broken lines, are associated with a row of N colour cells constituted by the first two rows of picture cells, that is to say, the picture cells which are driven via the lines $3^a$ and $3^b$.

When line electrode $3^a$ is energized during a period $\frac{1}{2}t_1$, the picture cells R(ed) and G(reen) of colour cells 21 are activated, as well as picture cells B(lue) of colour cell 22. During the subsequent period $1/2t_1$ the line electrode $3^b$ is energized so that the picture cells B(lue) of colour cell 21 and R(ed) and G(reen) of colour cell 22 are activated. The relevant information for colour cell 21 is present in register $10^a$ and hold circuit $11^a$, for colour cell 22 in register $10^b$, and hold circuit $11^b$, respectively. Since the video signal 12 having a length of $t_0$ is split up into 2 subsignals whose RGB sample patterns are alternately stored in the registers $10^a$ and $10^b$, it is achieved that the colour cells are now distributed over 2 rows of picture cells so that a smaller horizontal distance between two colour cells is possible than in the device according to European Patent Application No. 0,158,366. Thus, N/2 RBG patterns with which the N colour cells (denoted diagrammatically by 21, 22) are provided with information are present in each of the registers $10^a$ and $10^b$, respectively.

Of the actual TV line period of approximately 64 $\mu$sec only the part having the length of $t_0$ containing significant information (approximately 50 $\mu$sec) is sampled. For driving the display cells, however, the full TV line period of 64 $\mu$sec is available as display period $t_1$. The information is thus principally available for driving the display elements over a longer period than is presented to the device.

The transistors 5 are connected through source zones 6 to coloumn electrodes 4 via which the information concerning the colour signals is presented from the hold circuits 11. It is to be noted that the information in these hold circuits can still remain present while the registers 10 are already being provided with new information, for example, because a new video signal 12 is presented.

The device of FIG. 1 provides an improved picture due to the better definition of colour cells while in addition the number of columns connections is reduced because 3 column connections are required for 2 colour cells instead of 6 as in the device according to European Patent Application No. 0,158,366. The colour display mode is further described in FIG. 2. The data or column electrodes are connected to the hold circuit 11 via switches 16 which are driven, for example, from the multiplex circuit 15 in such a manner that upon energizing of the lines $3^a$, and $3^c$, etc. the switches 16 are in position (1) while position (2) is assumed when lines $3^b$, $3^d$, etc. are energized. The hold circuit 11 is diagrammatically shown in this embodiment in which the first 3 signals RGB form part of the first sampling signal, the second 3 signals RGB form part of the second sampling signal, the third 3 signals RGB form part of the first sampling signal again, etc. The two sampling signals thus stored in the circuit 11 and obtained from a video signal having a length of $t_0$, for example, a first picture line are again presented as two sub-signals to the column electrodes 4 during the periods of $\frac{1}{2}t_1$.

During the first period of $\frac{1}{2}t_1$ line electrode $3^a$ is energized while the switches 16 are in position (1), in other words, the elements R and G of the colour cells 21 and 23 are activated while element B of colour cell 22 is activated.

During the second period of $\frac{1}{2}t_1$ line electrode $3^b$ is energized while the switches 16 assume position (2) so that the elements B of the colour cells 21 and 23 are activated and the elements R and G of colour cell 22 are activated.

After the hold circuit 11 has been provided with a new sampling signal, for example, line electrode $3^c$ is energized in a subsequent picture line, while the switches 16 assume position (1) again, the elements R and G of the colour cells 25 and 27 are energized and element B of colour cell 26 is energized. This process is continued until the last row of picture cells has been provided with information.

FIG. 3 is a diagrammatical cross-section taken on the line III-III in FIG. 2 in which the MOS-transistor 5 is realized as a thin-film transistor (TFT). The TFT has a gate electrode 8, on which a layer of insulating material 31 of, for example, silicon nitride extends, which layer is coated with a layer 32 of semiconductor material such as hydrogendoped amorphous silicon. The layers 8, 31 and 32 are precipitated in a generally conventional manner on an insulating substrate 30 of, for example, glass and are patterned. Similarly in a generally conventional manner the semiconductor layer 32 is provided with highly doped parts 6 and 7 of, for example, n-type conductivity which function as source and drain zones and are contacted via connection tracks 33, 34 of, for example, aluminum.

The connection track 34 connects the drain zone 7 to a transparent electrode 35 of, for example, indium tin oxide forming part of a picture cell 2. The picture cells 2 comprise on a second substrate 40 a transparent counterelectrode 36 which is connected to, for example, ground potential which liquid crystal material 37 is present between the electrodes 35 and the counter-electrode. The electrodes 35 may have different shapes; in addition to the square shape of FIG. 2 the electrodes may alternatively have, for example, a triangular or hexagonal shape. For the purpose of colour display the device is also provided with a colour filter 38 having such a pattern (see FIGS. 1, 2) that three primary colours coincide with the picture cells. Depending on the type of liquid crystal and the mode of use the device is also provided with one or more polarizers 39. The layer 31 of insulating material and a similar layer 41 provided on the counterelectrode 36 as orientation layers in order to orient the liquid crystal.

FIG. 4 diagrammatically shows a number of picture cells 2 in a plan view which pass red, blue and green light in a given pattern due to the presence of the colour filter. The sampling signals are stored again in hold circuits $11^a$, $11^b$.

In the same manner as described with reference to FIG. 2 the line electrodes 3 can be successively energized via a multiplex circuit 9 so that the colour cells 21, 22, 23, 24 are energized which display, for example, the information of the first picture line of an odd television raster, and subsequently the colour cells 25, 26, 27, 28 associated with the third picture line are energized, etc.

After the odd raster the even raster is received via the input circuit 13 and sampled in such a manner again that two sub-signals are stored in the hold circuits $11^a$, $11^b$ commencing with the second picture line. While the switches 16 are in position (2), line electrode $3^b$ is energized during a period $\frac{1}{2}t_1$ via the multiplex circuit 9. This implies that the picture cells B of the colour cells 17 and 19 are energized and take over the information from the hold circuit $11^a$, while the picture cells R, G of the colour cells 18 and 20 are energized which take over their information from the hold circuit $11^b$. During the next period $\frac{1}{2}t_1$ the electrode $3^c$ is energized so that similarly the information for the picture cells R, G of colour cells 17, 19 and the information for the picture cells B of colour cells 18, 20 is taken over. After the information of the fourth picture line has meanwhile been taken over in the hold circuits $11^a$, $11^b$, line electrode $3^d$ is energized during $\frac{1}{2}t_1$, etc.

In this manner the second row of picture cells is driven by the first picture line during the odd rasters and by the second picture line during the even rasters, the third row of picture cells is driven by the third picture line and the second picture line, respectively, the fourth row of picture cells is driven by the third and fourth picture lines. Due to this drive mode the number of row electrodes is halved with respect to the device of FIGS. 1, 2. The colour cells 21, 22, 23 originating from the odd raster constitute a pattern of non-overlapping colour cells likewise as the colour cells 17, 18, 19 from the even raster, with the two patterns being shifted with respect to each other over half a period.

In the device as is diagrammatically shown in FIG. 5 the resolution in the horizontal direction is still further increased because the colour cells are defined in such a manner that each time two colour cells have two common picture cells. Sampling is then effected in such a way that the two hold circuits $11^a$, $11^b$ each comprise 2 sub-sample signals. Stored in hold circuits $11^a$ are the sub-sample signals which determine the colour cells 21, 22, 23 denoted by broken lines and associated with the odd raster in the same way as described with reference to FIG. 2, while hold circuits $11^b$ similarly comprises second sub-sample signals for display of the colour cells 17, 18, 19 denoted by dotted lines and associated with the even raster. Starting from video signals having a length of $t_0$ the line electrodes $3^a$, $3^b$ are each energized during $\frac{1}{2}t_1$ when the odd raster is displayed, while the line electrodes $3^a$, $3^b$ are also each energized during $\frac{1}{2}t_1$ when the colour cells 17, 18, 19 (denoted by dotted lines) associated with the even raster are displayed. Since the colour cells 17, 18, 19 are not located exactly between the colour cells 21, 22, 23, the sampling of the video signal is to be varied in an analogous manner, for example, in that sampling does not take place with substantially equal intervals but, for example, with intervals in a mutual ratio of 2:1. Here again averaging is possible in the same manner as described with reference to FIG. 4.

The invention is of course not limited to the embodiments shown, but several variations are possible within the scope of the invention to those skilled in the art. As already stated, the sub-cells may have a different shape, while other materials may also be chosen for the electrooptical medium such as an electrophoretic suspension or an electrochrome material.

Interlacing between an even and an odd raster (1:2 interlacing) has mainly been described in the main embodiment. It is of course alternatively possible to process signals obtained by 1:n interlacing in which dependent on the raster to be displayed a different set of electrodes is energized. Several variations are also possible for realizing the electronic driving components. Various forms of active matrix drives are possible, for example, with TFT's, MIM's, diode rings or other diode circuits.

What is claimed is:

1. A display device for color display comprising
an electro-optical medium,
a pattern of line electrodes crossing a pattern of column electrodes to provide display elements in a matrix of picture cells of said electro-optical medium,
wherein at least two adjacent rows of said picture cells constitute a row of N color elements,
first means for driving said line electrodes, conversion circuit means for sampling incoming signals having a length of $t_0$, said incoming signals being displayed at a frequency of $f_0 = N/t_0$, and said conversion circuit means converting each of said incoming signals into at least two sampling signals applied to said column electrodes during a display period of $t_1$, where $t_1 > t_0$, wherein only one of said two sampling signals is applied to said column electrodes during driving of a line electrode associated with at least one row of said picture cells, said line electrode being energized during a period of at most $\frac{1}{2}t_1$.

2. A display device according to claim 1 for displaying a television picture, wherein two juxtaposed rows of said picture cells are provided each time for displaying only one picture line.

3. A display device according to claim 1 for displaying a television picture, wherein a row of said picture cells is provided for displaying different picture lines.

4. A display device according to claim 3, wherein said incoming signals are divided into a first raster of odd picture lines and a second raster of even picture lines, wherein beginning with a first of said line electrodes said signals of said first raster of odd picture lines are presented to said column electrodes during driving of successive ones of said line electrodes, and wherein beginning with a second of said line electrodes said sampling signals of said second raster of even picture lines are presented to said column electrodes during driving of successive ones of said line electrodes.

5. A display device according to claim 1, claim 2, claim 3, or claim 4, wherein color elements in said row of N color elements are contiguous but non-overlapping, and wherein said sampling signals from two successive rasters are provided to said line electrodes to shift said color elements originating from said two rasters with respect to one another, said shift being one half a period of a pattern of said color elements.

6. A display device according to claim 1, claim 2, claim 3 or claim 4, wherein said sampling signals are provided from two successive rasters, said sampling signals being passed to said line electrodes to at least partly overlap color elements from said row of N color elements, said successive rasters being sampled for said sampling signals according to a mutual position of said color elements within said row of N color elements.

7. A display device according to claim 5, wherein said picture cells have a shape of a regular polygon.

8. A display device according to claim 6, wherein said picture cells have a shape of a regular polygon.

9. A display device according to claim 1, claim 2, claim 3, or claim 4, wherein said picture cells have a shape of a regular polygon.

10. A display device according to claim 5, wherein said electro-optical medium is a liquid crystal.

11. A display device according to claim 6, wherein said electro-optical medium is a liquid crystal.

12. A display device according to claim 1, claim 2, claim 3, or claim 4, wherein said electro-optical medium is a liquid crystal.

13. A display device according to claim 5, wherein said electro-optical medium is an electrophoretic suspension.

14. A display device according to claim 6, wherein said electro-optical medium is an electrophoretic suspension.

15. A display device according to claim 1, claim 2, claim 3, or claim 4, wherein said electro-optical medium is an electrophoretic suspension.

16. A display device according to claim 5, wherein said electro-optical medium is an electrochromic material.

17. A display device according to claim 6, wherein said electro-optical medium is an electrochromic material.

18. A display device according to claim 1, claim 2, claim 3, or claim 4, wherein said electro-optical medium is an electrochromic material.

19. A display device according to claim 1, claim 2, claim 3, or claim 4, wherein said first means include a plurality of active circuit elements.

20. A display device according to claim 19, wherein said active circuit elements include thin film IGFET transistors having source zones electrically connected to said line electrodes, having gate electrodes electrically connected to said column electrodes, and having drain zones electrically connected to said display elements.

* * * * *